Aug. 22, 1944.   C. SCHULZ ET AL   2,356,624
VEHICLE BODY
Filed May 5, 1941   6 Sheets-Sheet 1
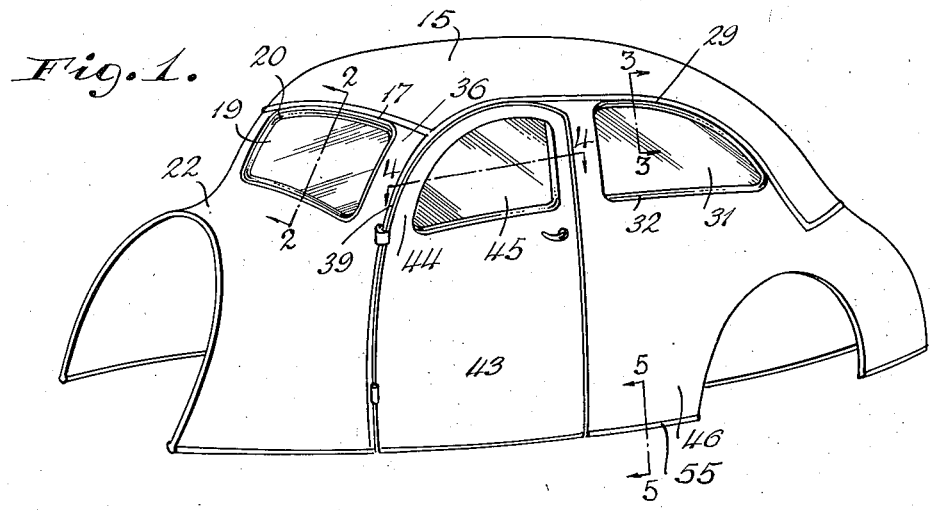
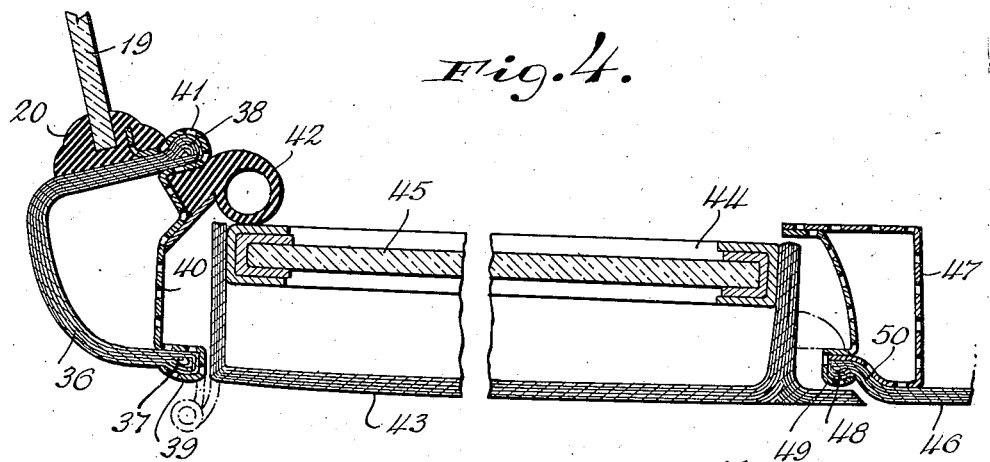
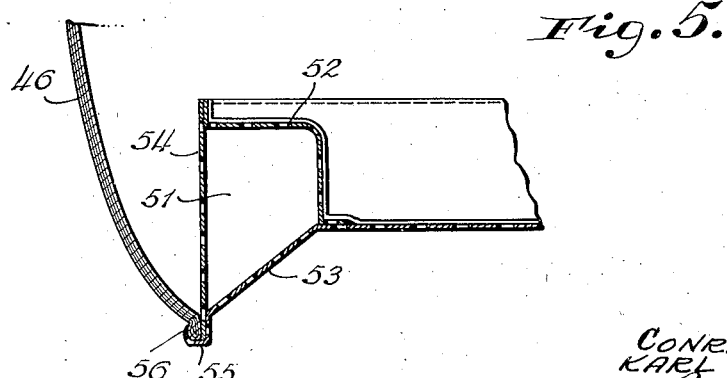
INVENTORS
CONRAD SCHULZ
KARL TANDETZKE
BY
Richards & Geier
ATTORNEYS

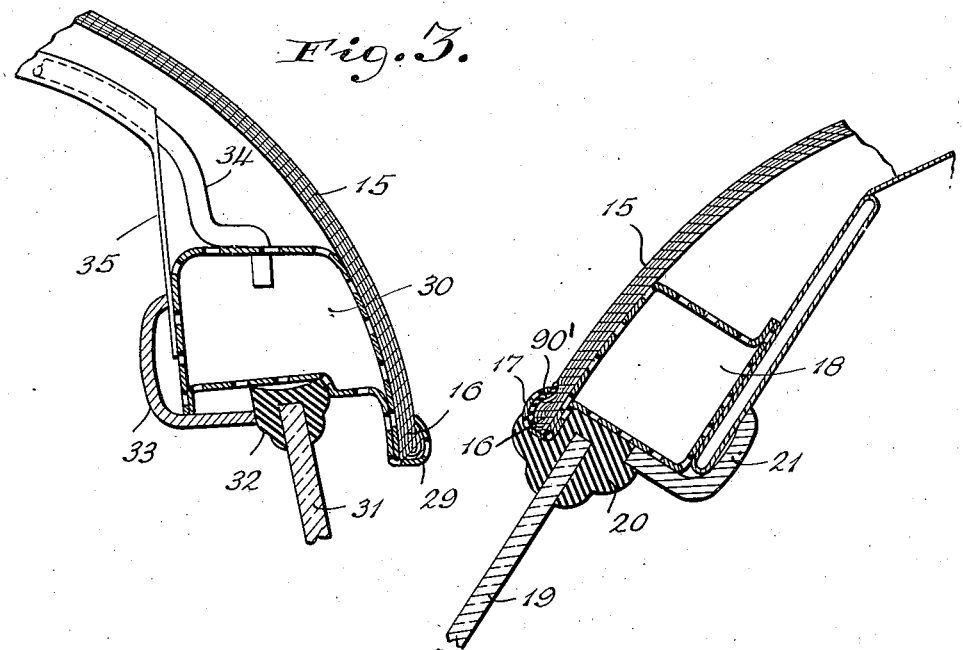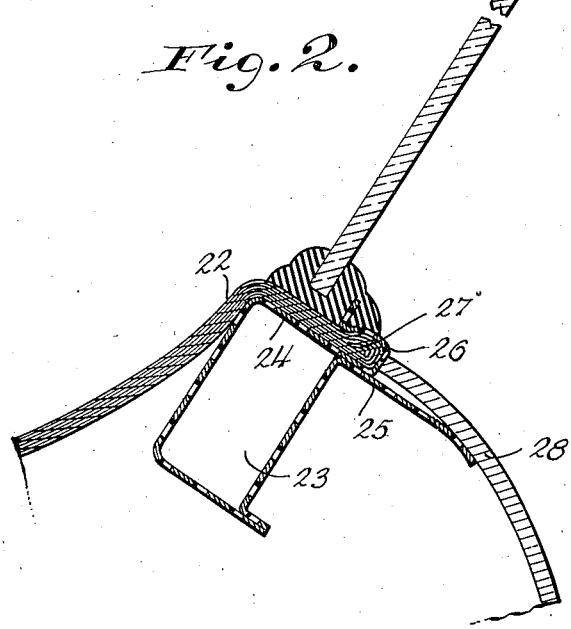

Aug. 22, 1944.   C. SCHULZ ET AL   2,356,624
VEHICLE BODY
Filed May 5, 1941   6 Sheets-Sheet 3
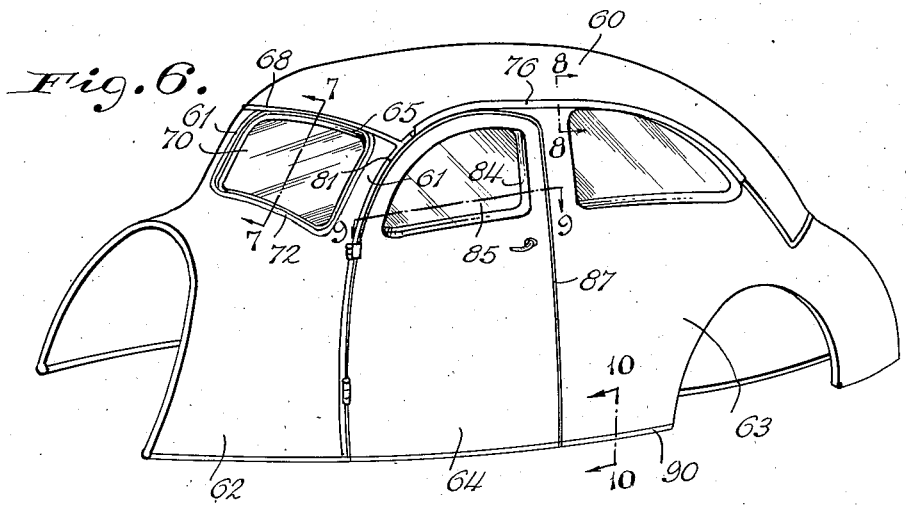
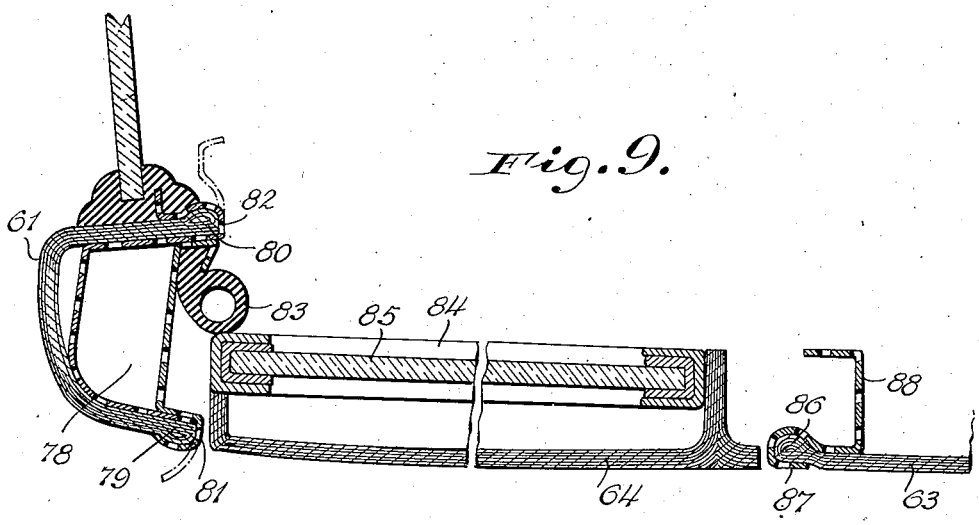
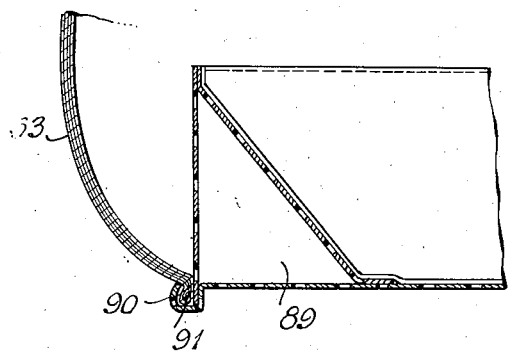
INVENTORS
CONRAD SCHULZ
KARL TANDETZKE
BY
Richards & Geier
ATTORNEYS

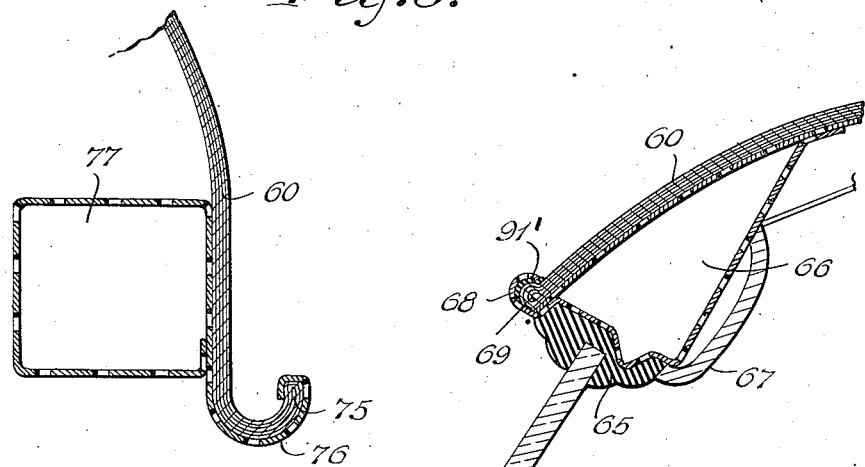
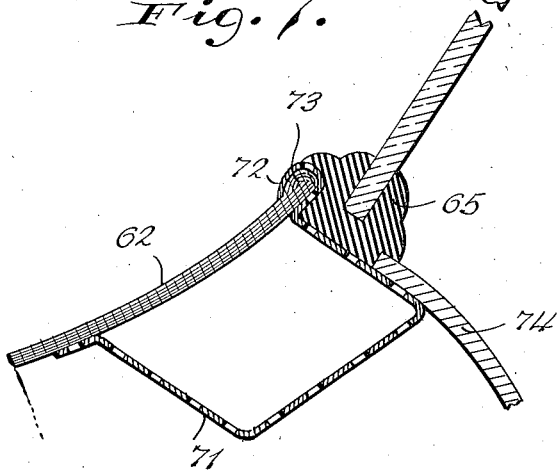

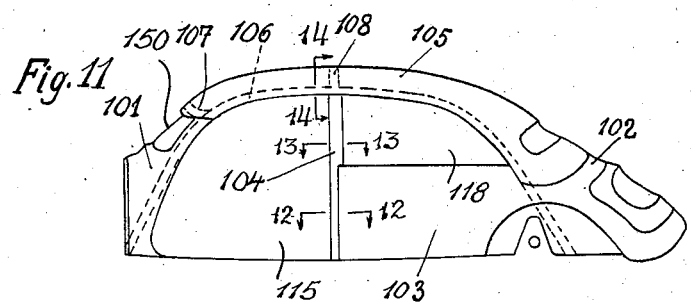
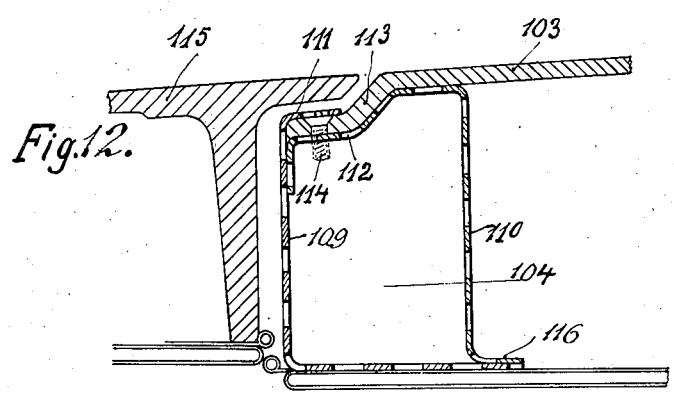
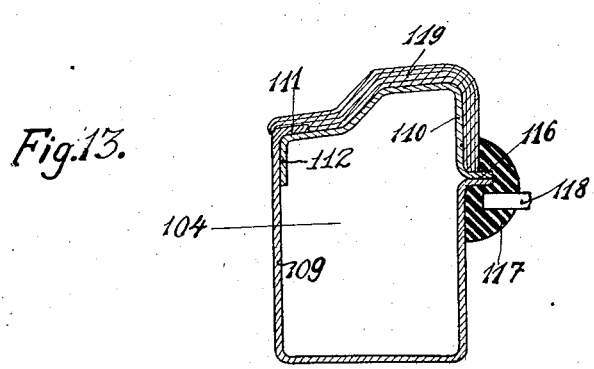

Aug. 22, 1944.   C. SCHULZ ET AL   2,356,624
VEHICLE BODY
Filed May 5, 1941   6 Sheets-Sheet 6
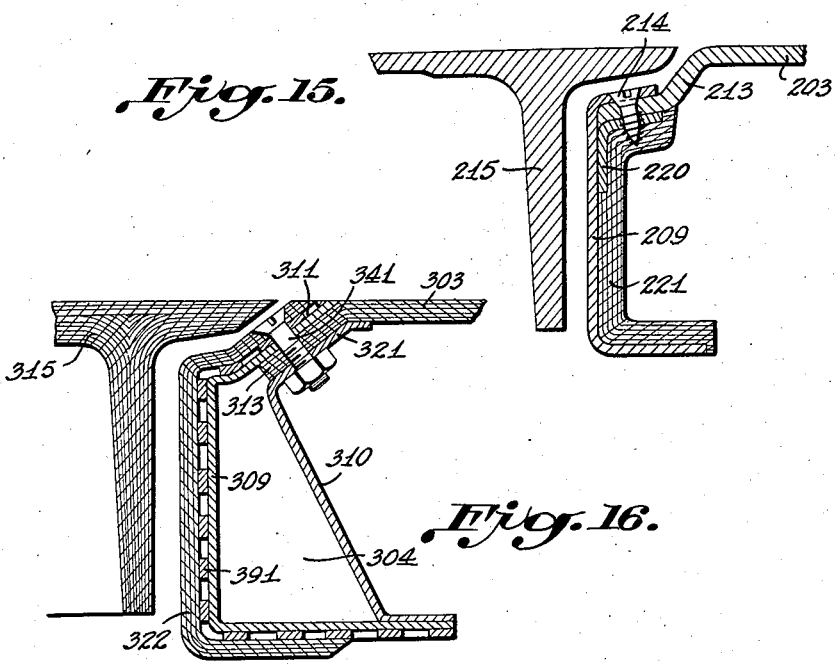
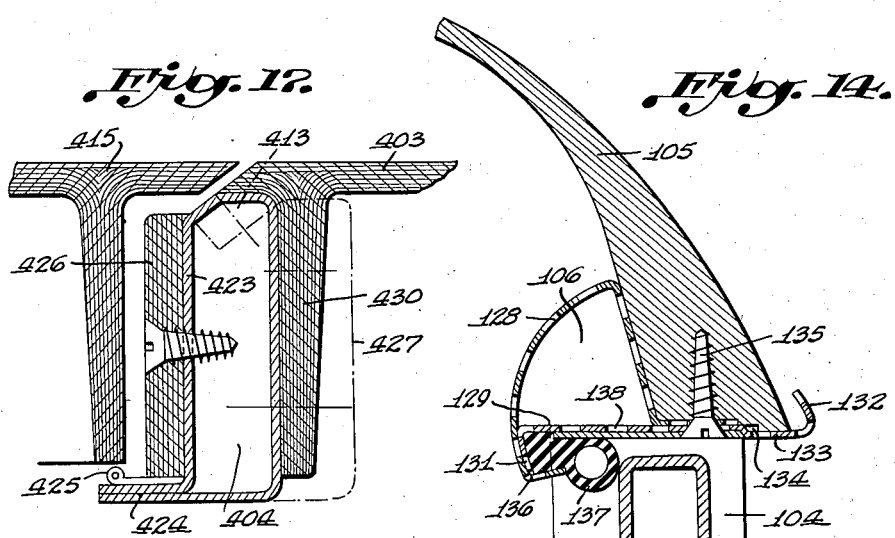
Inventors:
CONRAD SCHULZ
KARL TANDETZKE
By Attorney.

Patented Aug. 22, 1944

2,356,624

UNITED STATES PATENT OFFICE 2,356,624

VEHICLE BODY

Conrad Schulz, Berlin-Spandau, and Karl Tandetzke, Teltow, Germany; vested in the Alien Property Custodian Application May 5, 1941, Serial No. 391,888
In Germany September 2, 1939

2 Claims. (Cl. 296—28)

This invention relates to a vehicle body, such as an automobile body composed of a plurality of parts, such as the roof, sides, rear, and windshield frame, which consists of artificial materials of great strength and elasticity. Preferably, these materials consist of laminated pressings saturated with a synthetic resin. The pressings are usually made of fibrous materials, namely, paper or cardboard bands or textile bands which are saturated with synthetic resin. This invention refers also to a method of making such an automobile body.

The various automobile body parts are pressed into the desired shape out of a large number of layers of saturated materials in suitable forms, mostly steel molds. The finished parts are usually interconnected by glue, bolts or rivets. For this purpose, the edges of these body parts are provided with connecting flanges adapted to receive the bolts or other connecting means and extending at right angles to the surfaces of the body parts. These flanges are pressed together with other portions of the body parts, and in order that the flanges and the portions adjacent thereto should be sufficiently strong and resistant to bending forces, strengthening ribs are provided in zones of greater stress.

In comparison with all other portions of an automobile body part, which are fairly thin, the connecting flanges and the strengthening ribs present a considerable accumulation of material. The hardening time of the pressing in the mold and, consequently, the output of the latter, are determined by the thickest cross-section of the pressing, so that the flanges and ribs make it necessary to increase the time of pressing automobile body parts to a considerable extent.

Furthermore, the connecting flanges make the pressing process much more difficult than it would be otherwise; often the paper or textile bands cannot extend through the entire body part, so that additional tablets of the material must be compressed at places where the connecting flanges are to be formed. In many instances the flanges and ribs harden in a different manner than a thin wall hardens. All this results in that a body part is produced the strength of which is different at different places.

A further drawback of these connecting means consists in that in case of an accident, when the interconnected portions are subjected to an excessive strain, the flanges can easily tear off, since their cross-sectional areas are weakened by holes provided therein for screws and bolts, so that their resistance against bending forces is quite weak. The flanges can be easily strained above the elasticity limit of the material, and then breakage results.

An object of the present invention is to eliminate the drawbacks of prior art constructions and to provide an automobile body various parts of which, consisting of laminated materials saturated with artificial resin, can be easily and quickly pressed and assembled without the use of thick and heavy flanges.

Another object is the provision of novel, simple and effectively operating connecting means for the various parts of an automobile body.

A further object is to provide connecting means for automobile body parts which will make it possible to manufacture comparatively thin body parts of great strength, said parts consisting of layers of continuously extending impregnated bands.

A still further object is the provision of comparatively thin automobile body parts of great elasticity and strength and small weight, which can be easily and conveniently connected with each other, and when so connected, will constitute an automobile body of great strength and resistance against shocks.

An additional object of the present invention is to facilitate the manufacture of pressed automobile body parts and to make this manufacture economical by eliminating inconveniently thick cross-sectional areas of such body parts.

A further object is to simplify and expedite to the greatest possible extent the assembly of parts constituting an automobile body.

Yet another object of the present invention is to provide automobile body parts all the portions of which are alike in texture and wall thickness and have the same arrangement of layers, so that each body part is of comparatively uniform strength throughout the various portions thereof, and so that all portions or zones of a body part may be subjected to a uniform strain.

Other objects of the present invention will become apparent in the course of the following specification.

In realizing the objects of the present invention, it was found advisable to strengthen from the inside the zones of greatest stress of the body parts, consisting of pressed synthetic resin saturated material, through the provision of profiled metal bars interconnected to form a continuous supporting structure. This structure may be provided with clamping devices which are preferably bent over the edges of the various body parts and which unite them into an assembled body. Consequently, in accordance with an embodiment of the present invention, no rivets or bolts are used to interconnect the various body parts, which may be connected directly to the metal bars, thereby making it possible to eliminate the usual thick connecting flanges.

In accordance with a preferred embodiment of the inventive idea, the connecting edges of the automobile body parts are slightly thickened to form beads enclosed by metallic connecting flanges of frame supports, for instance, box-like metal rods, said flanges being bent over the beads. Thus, the edges of the body parts are made only slightly thicker than all the other portions of the body parts.

In accordance with another preferred embodiment of the inventive idea, the metal bars are coated with artificial resin, in order that the properties of the two substances may advantageously supplement each other, particularly as far as firmness is concerned. Since steel and artificial resin have different coefficients of expansion, the steel bar may be covered with an aluminum bar by a rolling process in such manner that the two metals can move relatively to each other during heat expansion. Aluminum has the same coefficient of expansion as artificial resin and serves, therefore, as a carrier for the artificial resin mass which, preferably, is carried by laminated fillers. Obviously, the steel inserts may be eliminated entirely and the frame structure may consist of hard aluminum bars.

The invention will appear more clearly from the following detailed description when taken in connection with the accompanying drawings, showing, by way of example, preferred embodiments of the inventive idea.

In the drawings:

Figure 1 is a perspective view of an automobile body constructed in accordance with the principles of the present invention.

Figure 2 is a section along the line 2—2 of Figure 1, on an enlarged scale, and shows the connection of the windshield frame to the roof and front part of the automobile body.

Figure 3 is a section along the line 3—3 of Figure 1 and shows means supporting the side edge of the roof.

Figure 4 is a section along the line 4—4 of Figure 1 and shows the windshield frame support, the door and the side wall of the automobile body.

Figure 5 is a section along the line 5—5 of Figure 1 and illustrates the connection of the side wall to the automobile floor.

Figure 6 is a perspective view of an automobile body of a somewhat different form.

Figure 7 is a section along the line 7—7 of Figure 6.

Figure 8 is a section along the line 8—8 of Figure 6.

Figure 9 is a section along the line 9—9 of Figure 6.

Figure 10 is a section along the line 10—10 of Figure 6.

Figure 11 is a side view of a different automobile body.

Figure 12 is a section along the line 12—12 of Figure 11.

Figure 13 is a section along the line 13—13 of Figure 11.

Figure 14 is a section along the line 14—14 of Figure 11.

Figures 15, 16 and 17 are similar to Figure 12 and show in section differently constructed side posts.

The automobile body shown in Figures 1 to 5 of the drawings constitutes a self-supporting body consisting of a plurality of interconnected parts, which are pressed individually of laminated materials impregnated with artificial resin and which are interconnected by metal framework.

This metal framework is formed of box-like section supports consisting of pressed interconnected sheet bars. The supports are all connected with each other and constitute a skeleton framework.

The drawings show a roof 15 having the form of a tub and pressed of one piece from the impregnated material. The lower connecting edge of the roof 15 is provided with an outer bead-like flange 16 (Fig. 2) which extends around the roof. The flange 16 which is thicker than the other portions of the roof 15, is integral with these portions and is formed during the same pressing operation during which these portions are formed. The flange 16 may be formed of strips of impregnated material applied to the roof part prior to the pressing operation, and pulverized artificial resin binders may be added to the roof material before the pressing takes place.

Another method of manufacturing the thick flange 16 consists in applying less pressure to the edge than to other portions of the roof part. In that case, it is not necessary to add any additional materials to the roof part, and the greater thickness of the flange 16 is produced merely by subjecting the flange to a smaller force during the compression.

Since the strips which are saturated with artificial resin and which constitute the laminated part extend to the lower edge of the roof part, a roof is produced after the compression, which is of substantially the same firmness in all its portions.

The roof 15 is connected with the other parts of the automobile body by means of a connecting flange 17 of the roof support 18. In the construction shown in Figure 2, the roof support 18 has the form of a box in cross-section and consists of steel bars forming a supporting structure for the automobile body. However, the support 18 may be of any other suitable cross-sectional form. The steel bars consist of a plurality of section sheets which are welded together. One of these sheets is provided with a U-shaped extension constituting the connecting flange 17, which receives the flange 16 of the roof 15.

In accordance with the present invention, the flange 17 is bent over the thick flange 16 of the roof, so that a close and firm connection is attained. In mass production, the bending over of the flange 16 is preferably carried out by intermittent blows exerted by compressed air hammers.

If necessary, suitable sealing means, such as a thin layer of rubber $90^{I}$, may be inserted between the two flanges.

The windshield glass 19 is enclosed on all sides by a profiled rubber frame 20. The upper horizontal edge of the frame 20 is held firmly between the adjacent forwardly projecting edge of the roof (Fig. 2) and a ledge 21 which is attached to the frame 18.

The forward part or cowl 22 of the automobile body, which is situated below the windshield 19, is connected to a box-like transverse support 23. This support is composed of two U-shaped pressed sheets, the legs of which are welded to each other at their contacting surfaces.

The legs 24 and 25 which are situated directly below the windshield 19, are so formed that the free edge of the leg 24 constitutes a flange 26 which is bent over the thick flange or edge 27 of the forward body part 22, while the member 25 also serves as a support for the instrument board 28, which may be connected by screws thereto.

The roof 15 is attached to the sides of the automobile body and to its rear in a substantially similar manner. The support 23 may connect the cowl 22 with the roof 15. As shown in Figure 3, each side of the roof is supported by a flange 29 which is bent over the flange or edge 16 of the roof 15. The flange 29 constitutes a part of the longitudinal beam 30 of the automobile roof.

The side window 31 of the automobile is held in an elastic frame 32 the upper horizontal part of which is held between the beam 30 and a ledge 33. A reinforcing member 34 projects into the beam 30 and is used for holding the inner roof covering 35.

The manner in which the windshield post 36 is constructed and supported is shown in Figure 4. The post 36 consists of a pressing which is substantially U-shaped in cross-section and which is open toward the interior of the body. The two legs of the U have free ends constituting flanges or thick edges 37 and 38.

A connecting flange 39 constituting a part a supporting bar 40, encloses the flange 37 of the post 36. The other end of the bar 40 projects into the rubber frame 20 and has the form of a flange 41 embracing the edge 38 of the post 36.

The bar 40 can have any desired form, particularly as far as its cross-section is concerned, and also serves as a support for the door packing 42.

The door 43 of the automobile body carries a frame 44 for the door window 45. The frame 44 engages the elastic member 42 when the door is closed.

The end 50 of the automobile side wall 46 which is situated close to the door 43, is bent inwardly to a slight extent to constitute an abutment for the adjacent end of the door. The end 50 is strengthened by a somewhat thickened edge or flange 48 which extends vertically and constitutes an outwardly projecting element. A connecting flange 49 constituting a part of the metallic post 47 is bent around the projecting flange 48.

The metallic post 47 which has the form of a box in cross-section, is so formed that it provides a tight fit in relation to the end 50 of the sidewall 46.

Figure 5 shows the manner in which the side wall 46 is attached to the floor of the automobile body. The floor is carried by longitudinal side supports 51 which have the form of a box in cross-section. Each support 51 is formed of a sheet 52 which is bent in the form of a step and a sheet 53 which is inclined downwardly and which is connected with a vertical sheet 54, whereby a quadrilateral body is formed.

The lower edge of the sheet 53 is bent to form a flange 55 which receives the beaded edge or flange 56 of the side wall 46. The flange 55 is bent around the edge 56.

The automobile body shown in Figures 6 to 10 of the drawings is substantially similar to the one described.

This body includes a roof 60, windshield posts 61, a front part or cowl 62, side walls 63, and doors 64. The frame 65 which carries the windshield 70, is made of rubber and its upper portion is supported by a bar 66 which is triangular in cross-section, as shown in Figure 7. A ledge 67 is attached to the bar 66, one end of which forms a flange 68 which is bent around a bead-like edge 69 of the roof 60 and a rubber layer 91¹.

The lower edge of the windshield frame 65 is supported by a transverse support 71 which consists of a single outwardly open U-shaped metal sheet. The end 72 of the bent sheet 71 is bent around the bead-like edge 73 of the cowl 62. The support 71 also carries the dashboard 74.

As shown in Figure 8, the side edges 75 of the roof 60 may be bent upwardly to constitute a rain-collecting gutter and may be enclosed by a flange 76 of the longitudinal support 77.

As in the previously described construction, the windshield post 61 is connected with a metallic support 78 and its edges 79 and 80 are held by flanges 81 and 82 of the support 78 (Fig. 9). The support 78 also carries a packing 83 for the door 64. The door 64 carries a frame 84 for the door window 85.

As shown in Figure 9, the side wall 63 of this construction is straight and its edge 86 is enclosed by a flange 87 of the post 88.

As shown in Figure 10, the longitudinal floor support 89 is triangular in form and constitutes a closed body, the flange 90 of which is bent around the lower edge 91 of the side wall 63.

The automobile body shown in Figures 11 to 14 includes a cowl 101, a rear part 102, two side parts 103, two side posts 104 and a roof 105 (Fig. 11). The roof is pressed as a single body and its front constitutes the upper edge of the windshield frame, while its rear is mounted directly upon the rear part 102.

These body parts constitute a rigid body structure and at those zones where they are subjected to the greatest possible strain, they are strengthened by a simple metallic framework similar to a bridge structure. The metal frame includes two longitudinal supports 106 each of which extends upon one side of the vehicle body close to a side edge of the roof. The front portions of the supports 106 may serve as posts for the windshield frame, while the rear ends of the supports extend to the floor of the vehicle and may be used for strengthening the fenders and seat supports. However, the main purpose of the supports 106 is to strengthen the edges of the roof 105, so that the roof along with the cowl 101 and the rear post 102 constitutes a firm base of the body structure.

The longitudinal supports are connected with each other by transverse struts 107 and 108. The strut 107 extends along the front edge of the roof and carries profiled flanges which may be connected with a rubber frame carrying the windshield glass 150. The transverse strut 108, which may be dispensed with entirely, constitutes, preferably, a continuation of the side posts 104.

Due to the provision of side posts 104 cooperating with the edges of the roof 105, which are strengthened by the longitudinal supports 106, the walls of the side parts 103 extend only as far as the side windows 118. This makes it possible to eliminate large press molds which were used heretofore for the pressing of side parts which included the side window frames.

Figure 12 illustrates the portion of a side post 104 below the window 118. The post 104 is formed by two profile bars or struts 109 and 110 having bent portions 111 and 112 which clamp the edge 113 of the side part 103. The edge 113 is bent inwardly in relation to the side wall 103 and is of the same thickness. Screws 114 are preferably used for holding or tightening the edge 113. Thus the side part 103 is held firmly by the post 104.

Obviously, for the screws 114 may be substituted rivets or the like.

The side post 104 is shaped to constitute an abutment for the adjacent end of the door 115. However, the post 104 may carry hinges for the door 115.

Figure 13 shows the shape of the side post 104 above the side part 103. The edges 111 and 112 of the profiled struts 109 and 110 are firmly connected with each other. The abutting flanges 116 which form the second connection between the struts 109 and 110 are located substantially in the middle of the post 104 above the side part 103, so that these flanges can be used for holding the rubber frame 117 of the side window 118. The outer surfaces of the post 104 extending above the side part 103 may be provided with a coating 119 consisting of materials impregnated with artificial resin.

The coating 119 may be applied directly upon the post 104 or, if the edges 111 and 112 are of a somewhat different form, only the strut 110 of the post 104 may be provided with the coating 119.

The shape of a longitudinal support 106 and its connection with a side edge of the roof 105 are shown in Figure 14. The support 106 has the form of a sector in cross section and consists of a curved bar 128 and a supporting bar 129 provided with a flanged edge 131.

The edge 131 is firmly connected with an edge of the curved bar 128. Another edge of the bar 129 consists of an upwardly turned outwardly projecting flange 132 which constitutes a rain gutter.

The roof 105 is provided with a downwardly projecting portion 133. The surfaces of the edge of the roof 105 and of the projection 133 enclose a space 134. The support 129 is slightly bent downwardly close to the space 134. Due to this arrangement, rain is prevented from penetrating into the interior of the structure, so that the inner portions of the support 106 are protected against rust.

The support 106 is connected with the roof 105 by screws 135 extending close to the space 134.

The bar 128 has a downwardly and outwardly projecting edge 136 which is used for holding a rubber packing 137 for the door window.

An edge of the support 129 may be bent in a similar manner for holding another rubber packing for the side window 118. Figure 14 also shows the connection of a side post 104 with the edge of the roof 105. This attachment is carried out by means of flanges 138 constituting a bent portion of the struts 109 and 110 of which the post 104 is composed. The flanges 138 are welded to the support 129 on the one hand, and on the other hand, they are connected to the roof 105 by the screws 135. A flange of the support 106 may be bent outwardly at the place wherein the body parts 105 and 103 are in engagement with each other so that this flange can embrace an edge of the body part 103, thereby interconnecting the body parts 103 and 105.

The described metal supports increase the strength of the automobile body to a great extent, while the body parts may be made quite thin. This diminishes the weight of the body and the time required for the hardening of the body parts.

Figure 15 shows a side post 209 of a different and somewhat simpler form, cooperating with a door 215. The post 209 consists of a single profiled rod which is connected with a side wall 203 having a bent edge 213, by means of a bent insert or flange 220 and screws 214. In order to strengthen the post 209, its interior is covered by a layer 221 consisting of artificial resin materials.

Obviously, the same coating may be provided upon the outer surfaces of the post 209 as well.

Figure 16 shows a side post 304, the outer surfaces of which, situated within the door frame, carry a layer of artificial resin.

The post 304 includes a strut 309 made of a steel sheet and connected with an aluminum strut 391, the purpose of which is to provide a good support for the artificial resin layer 322. The struts 309 and 391 may be rolled together in the cold state, or they may be connected with each other by rivets or by the bending of their edges. If rivets are used, the rivet holes must be sufficiently large to enable a shifting of the struts 309 and 391 relatively to each other.

The second strut 310 constituting a part of the post 304 is similar to the strut 110 of Figure 12, but is provided with an outwardly bent flange 321. The side wall 303 of the automobile body is provided with a bent portion 313 which is clamped between the flange 321 and a flange 311 of the strut 309 by bolts 341.

In the construction shown in Figure 17, the side post 404 consists of a single bent metal sheet 423 having outwardly projecting edges 424 constituting an abutment for the door 415 and carrying a door packing 425. A coating 426 consisting of laminated materials impregnated with artificial resin is used to hold the packing 425. In this construction, the side wall 403 of the automobile body is attached to the side post 404 by means of a connecting flange 430.

The post 404 may be made wider above the flange 430, i. e. above the lower edge of the window, and may occupy the space enclosed by the broken line 427.

If the connection between the wall 403 and the post 404 is carried out by means of the bent edge 413, instead of the flange 430, then the entire post 404 from top to bottom should have the shape indicated by the line 427 and should be made similar to the post 104, shown in Figure 12.

It is apparent that the specific illustrations shown above have been given by way of illustration and not by way of limitation and that the structures above described are subject to wide variation and modification without departing from the spirit and scope of the present invention. All of such variations and modifications are to be included within the scope of the present invention.

What is claimed is:

1. A vehicle body, comprising a plurality of separate parts, each of said parts consisting of fibrous materials impregnated with artificial resin, a frame structure connected with said body parts and comprising a plurality of steel bars and aluminum bars covering said steel bars, and layers of fibrous materials impregnated with artificial resin and covering some of the surfaces of said aluminum bars.

2. A vehicle body comprising a plurality of separate parts, each of said parts consisting of fibrous materials impregnated with artificial resin, a frame structure connected with said body parts and comprising a plurality of metal supports consisting of pairs of supports made of different metals having different coefficients of expansion, means interconnecting said supports to permit a relative movement of supports having different coefficients of expansion, and layers of fibrous materials impregnated with artificial resin and extending through at least one support of a pair.

CONRAD SCHULZ.
KARL TANDETZKE.